(12) United States Patent
Duggan

(10) Patent No.: US 7,819,364 B2
(45) Date of Patent: Oct. 26, 2010

(54) HANGER ROD STIFFENING CLIP

(76) Inventor: Daniel C. Duggan, 1318 Colony Way Ct., Chesterfield, MO (US) 63017

( * ) Notice: Subject to any disclaimer, the term of this patent is extended or adjusted under 35 U.S.C. 154(b) by 306 days.

(21) Appl. No.: 11/999,715

(22) Filed: Dec. 6, 2007

(65) Prior Publication Data

US 2008/0156945 A1    Jul. 3, 2008

Related U.S. Application Data

(63) Continuation-in-part of application No. 11/057,572, filed on Feb. 14, 2005, now abandoned.

(51) Int. Cl.
*F16L 3/08* (2006.01)
(52) U.S. Cl. .................. 248/74.3; 248/58; 248/67.7
(58) Field of Classification Search ............... 248/65, 248/49, 67.7, 74.1–74.3, 58
See application file for complete search history.

(56) References Cited

U.S. PATENT DOCUMENTS

| | | | | |
|---|---|---|---|---|
| 3,049,326 A | * | 8/1962 | Otterson | 248/59 |
| 6,202,962 B1 | * | 3/2001 | Snyder | 248/60 |
| 6,783,104 B1 | * | 8/2004 | Roth | 248/230.1 |
| 7,188,809 B1 | * | 3/2007 | Roth | 248/58 |
| 7,207,527 B2 | * | 4/2007 | Opperthauser | 248/55 |
| 7,258,519 B2 | * | 8/2007 | Shimizu | 411/433 |
| 7,384,018 B2 | * | 6/2008 | Moretto | 248/74.1 |
| 7,540,454 B2 | * | 6/2009 | Gauger | 248/68.1 |
| 7,559,512 B1 | * | 7/2009 | diGirolamo et al. | 248/74.3 |

* cited by examiner

*Primary Examiner*—Ramon O Ramirez
*Assistant Examiner*—Steven M Marsh
(74) *Attorney, Agent, or Firm*—William B. Ritchie

(57) ABSTRACT

A preformed hanger rod stiffening clip that improves the strength and stability of hanger rods to withstand compression forces. Precisely positioned screw holes enable the clamping legs of the clip to close completely when the fastening assembly is tightened. Washers on each side of the respective clamping legs deform the legs tightly around the stiffening member and the hanger rod which is disposed between the stiffening member and fastening assembly. It has been found that hole placement for a screw that is used to tighten the apparatus onto the hanger rod and stiffening member is critical. Misalignment of position of the screw openings greater than or equal to 0.001 inches results in a clip that will fail standard AISC compression tests.

5 Claims, 6 Drawing Sheets

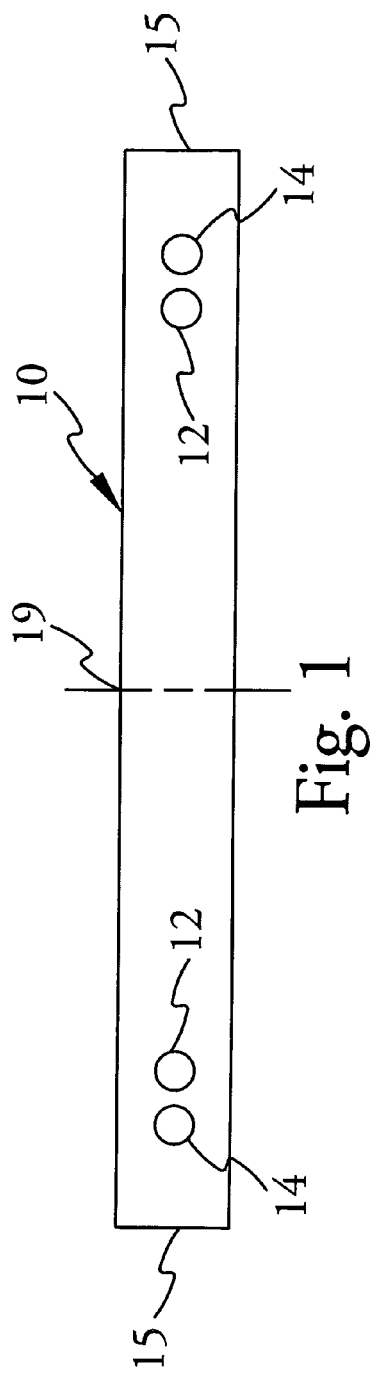
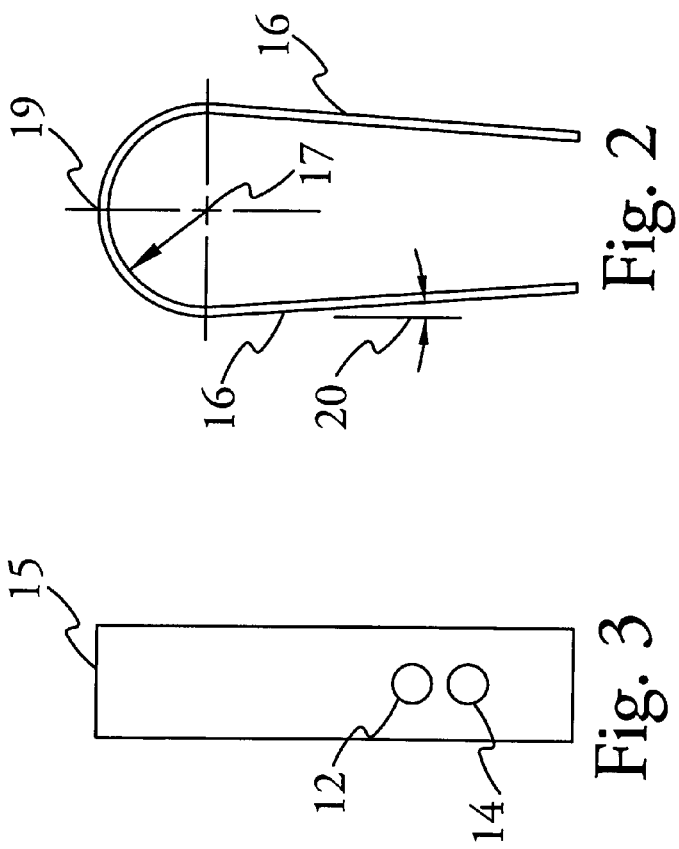
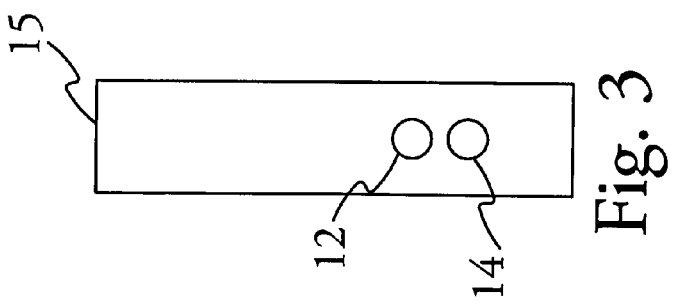

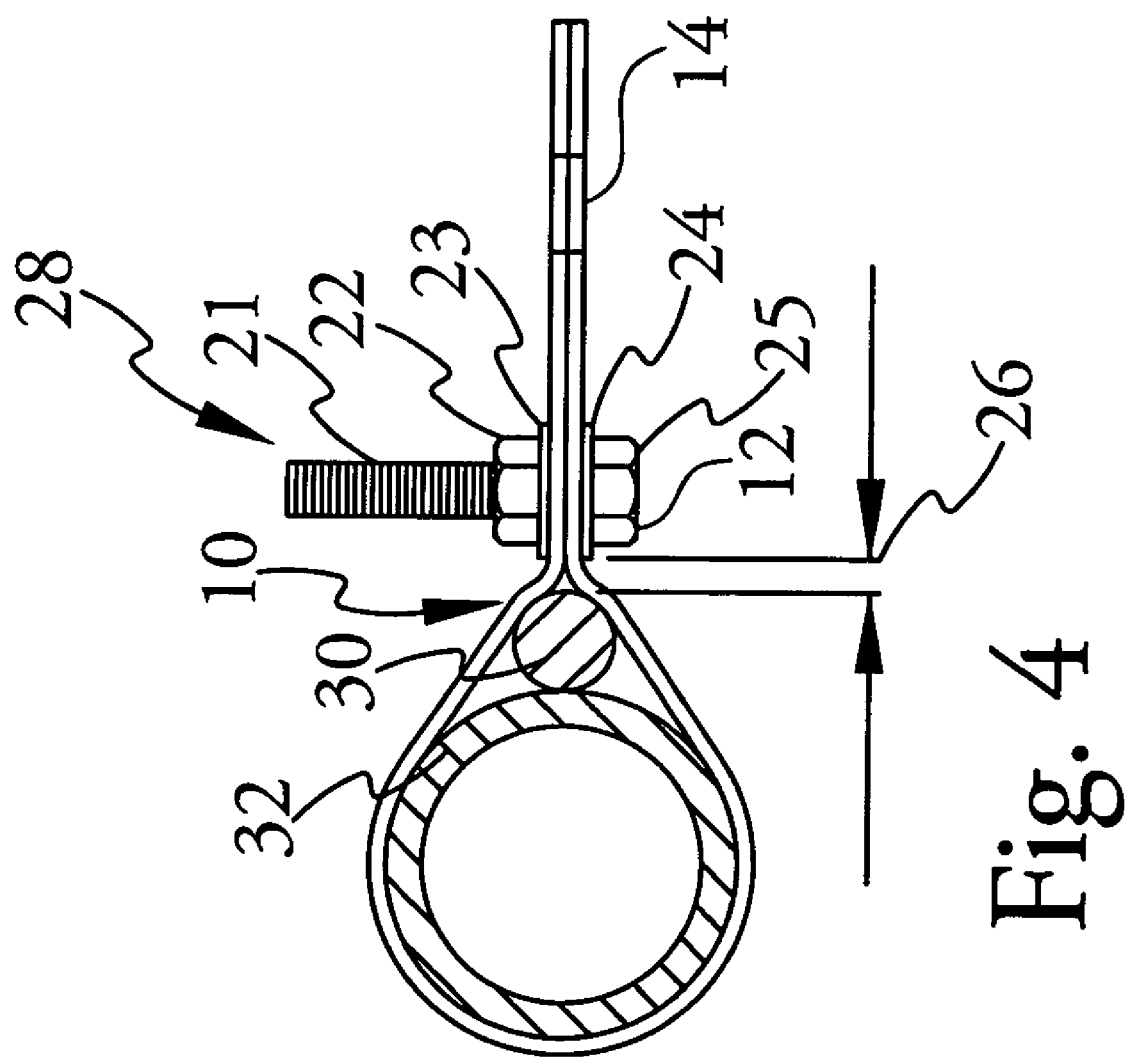

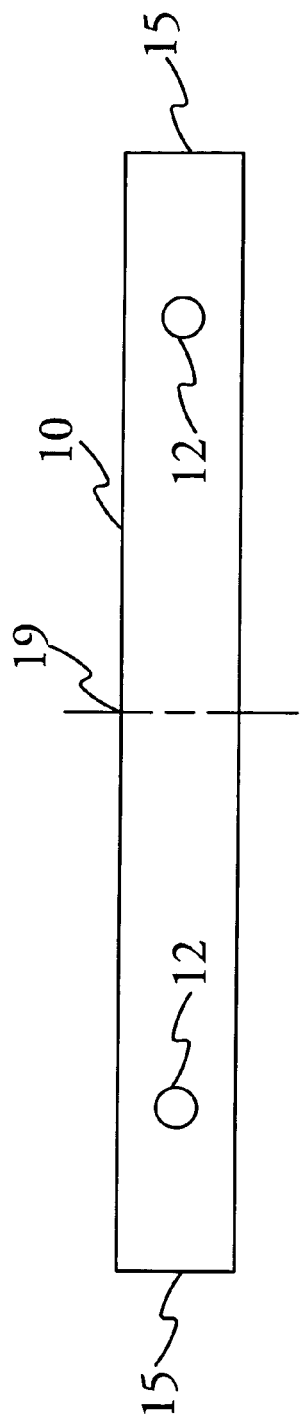
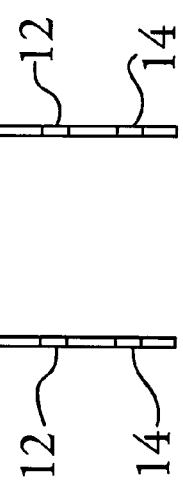
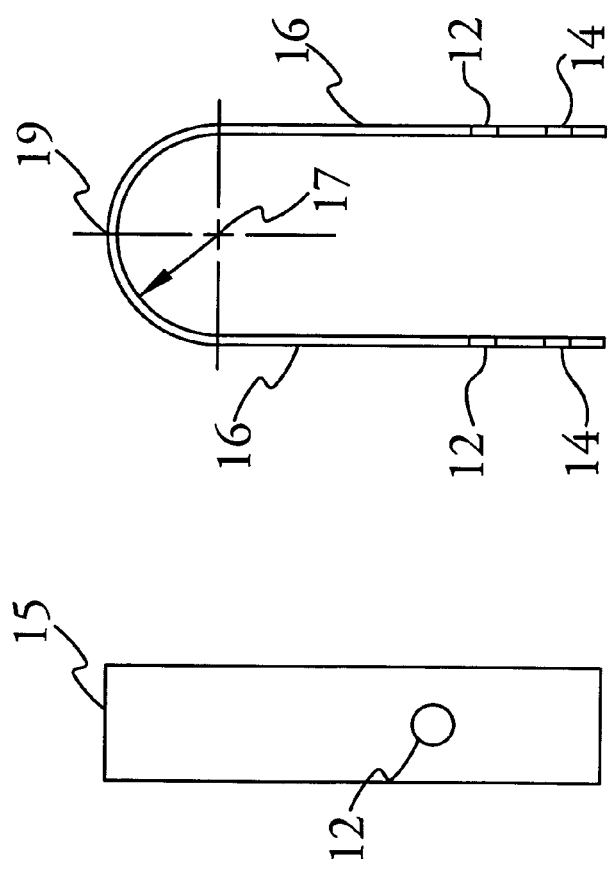

HANGER ROD STIFFENING CLIP

This application is a continuation-in-part application of U.S. patent application Ser. No. 11/057,572 filed on Feb. 14, 2005.

FIELD OF THE INVENTION

This invention relates to construction hardware, in particular, an apparatus to stabilize and strengthen hanger rods against buckling when the rods are used for supporting pipes, conduits or similar structures found in building construction in the face of unexpected movement as would be experienced in an earthquake.

BACKGROUND OF THE INVENTION

A hanger rod is part of a typical hanger assembly wherein one end of a threaded rod is vertically attached to the building structure and the other end has an attachment mechanism such as a yoke which is used to connect to the part that is to be supported such as water pipes. While these rods can be provided in any diameter, the typical size is either ⅜, ½, ⅝, ¾, ⅞, 1 or 1¼ depending on the structure that is to be supported. The lengths can be selected as needed for the particular construction project with less than 120 inches being typical.

Various structures and methods have been proposed to strengthen the hanger rod against deformation due to unusual stresses. Most of such devices make use of a stiffening channel strut, angle iron or pipe that is positioned substantial parallel to the hanger rod. Connection of the stiffening member can be provided by actually welding the member to the rod, however, this is extremely time-consuming and not practical due to the expense involved.

U.S. Pat. No. 6,783,104 discloses and claims a deformable clip that connects the stiffening pipe to the hanger rod. This device has the advantage of being low cost and relatively easy to install. However, testing by the inventors have found that this arrangement will buckle quite easily unless the location of the holes are held to very close tolerances contrary to the teachings found in the '104 patent. The '104 patent teaches the use of a carriage bolt to tighten the clip in place. Further, the use of a carriage bolt prevents the legs of the clip from being tightened against one another. This device requires that the stiffening pipe to be placed between the hanger rod and the attachment mechanism. The design flaws in this device result in clip failure unless a substantial greater number of them are utilized.

U.S. Pat. No. 4,141,107 issued to Shiman et al. on Feb. 27, 1979 discloses a clip attaching a single round member using a clip that is bent in place around the single round member attaching it to the surface.

U.S. Pat. No. 1,362,244 issued to Farley on Aug. 8, 1919 discloses a "U" shaped hanger assembly that does not have a hanger rod.

U.S. Pat. No. 2,872,141 issued to Hefner on Feb. 3, 1959 discloses a preformed round "O" shaped cable hanger that is designed to hold a single cable.

A hanger rod stiffening clip that can be easily attached, is inexpensive to produce and can be spaced at 24 inch clip spacing for ⅜ inch hanger rod from one clip to the next along the stiffening pipe, which is equal to the governing least radius of gyration ratio for ⅜ inch hanger rod to resist buckling, and can withstand compression force of at least 325 pounds on a test apparatus using a 120 inch long hanger rod in a typical installation, is not found in the prior art. A ⅜ inch hanger rod that is 24 inch long and is tested without stiffening clips will buckle at 125 pounds of compression pressure on the test apparatus.

SUMMARY OF THE INVENTION

It is an aspect of the invention to provide a hanger rod stiffening clip that can be manufactured from malleable galvanized straps to a precise tolerance using stamping techniques well known in the art.

It is another aspect of the invention to provide a hanger rod stiffening clip that can fit a plurality of hanger rod sizes.

It is still another aspect of the invention to provide a hanger rod stiffening clip that has a preformed tapered shape that will keep the clip in position on the hanger rod and associated stiffening pipe until the clip can be firmly tightened.

Another aspect of the invention is to provide a hanger rod stiffening clip that can be spaced in accordance with AISC formulas which are well known in the art and which provides a substantial increased resistance to buckling than is experienced with unstiffened rods.

Another aspect of the invention is to provide a hanger rod stiffening clip such that as the screw that pulls the legs of the clip are tightened, the clip urges the hanger rod which is disposed against the stiffening pipe at the edge of a flat washer under the head of the nut, which thereby deforms the clip. When the screw is completely tightened via the nuts, sufficient resistance is created by this action to prevent buckling of the hanger rod within the predetermined distance between clips and the loading force placed thereon.

Finally, it is an aspect of the invention to provide a hanger rod stiffening clip that has tapered legs so that the clip will stay in position until the clip can be tightened.

These and other aspects of the invention will become apparent in light of the detailed description of the invention that follows.

BRIEF DESCRIPTION OF THE DRAWINGS

FIG. 1 is a plan view of the clip in accordance with the invention.

FIG. 2 is front view of the clip showing the preformed preferred embodiment shape.

FIG. 3 is an end view of the clip shown in FIG. 2.

FIG. 4 is a cross-sectional view of the clip attached around a stiffening pipe and a hanger rod illustrating how the clip can be fully tightened so that the two clamping members can be pinched together via the washers.

FIG. 6 is a plan view of clip showing a single pair of opposing screw openings.

FIG. 7 is a front view of the clip shown in FIG. 6.

FIG. 8 is an end view of the clip showing an alternative embodiment of the legs of clip.

DESCRIPTION OF THE PREFERRED EMBODIMENTS

Figure 5:
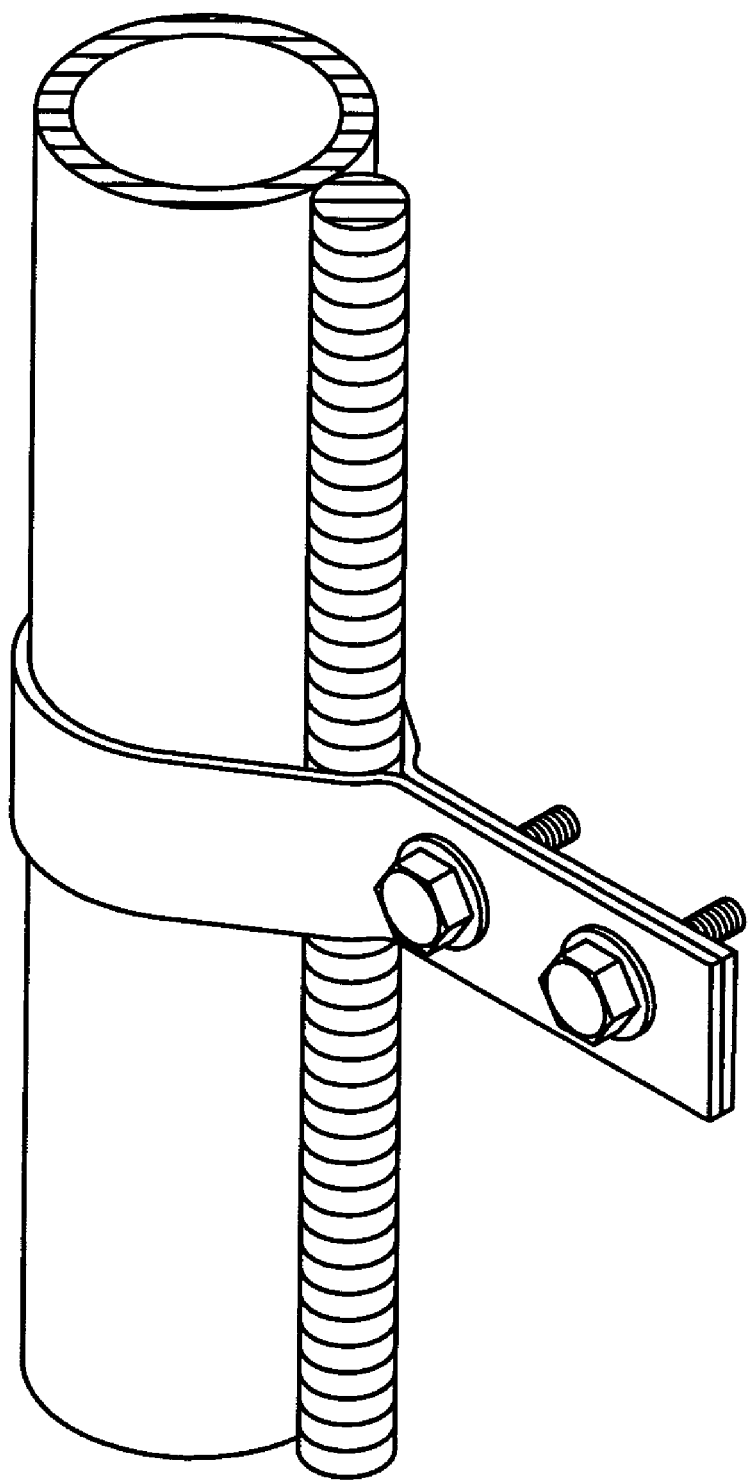
FIG. 5 is an isometric view of the invention in place around a stiffening member and a hanger rod.

The invention is a clip used for clamping around two round members, a hanger rod 30 and a stiffening member 32. Referring now to FIG. 1, clip 10 is preferably stamped from 1/16 inch thickness of galvanized sheet material. This thickness will provide sufficient strength for clip 10 to stabilize hanger rod 30 (shown in FIG. 4) by way of stiffening member 32 (also shown in FIG. 4) be sufficiently malleable to permit easy installation of clip 10 as is discussed below. In the preferred embodiment, two sets of opposing screw holes 12, 14 are provided. When positioned as noted below, clip 10 is able to accommodate three different sizes of hanger rod 30 . . . 3/8 inch, 1/2 inch and 5/8 inch. Other sizes of hanger rod 30 could also be used by merely adjusting the positioning of the screw holes as described herein.

Clip 10 is preferably 7 1/4 inches long by 3/4 inches wide. Hole set 14 is preferably 0.698 from edge 15. Note that all tolerances are ±0.0005 inches and well within the manufacturing limitations of most stamping equipment. Hole set 12 is preferably 1.062 inches from edge 15. Holes 12 and 14 are preferably 0.261 inches in diameter.

As shown in FIG. 2, the preferred preformed shape of clip 10 is illustrated. The clip 10 is bent in the center 19 of the length to provide substantially U-shape of equal clamping members 16. The radius 17 is 0.650 inches. In the preferred embodiment, the legs are bent inwardly at angle 20 so that the open end of the clip is less than diameter of the circular arc portion of the clip.

Figure 9:
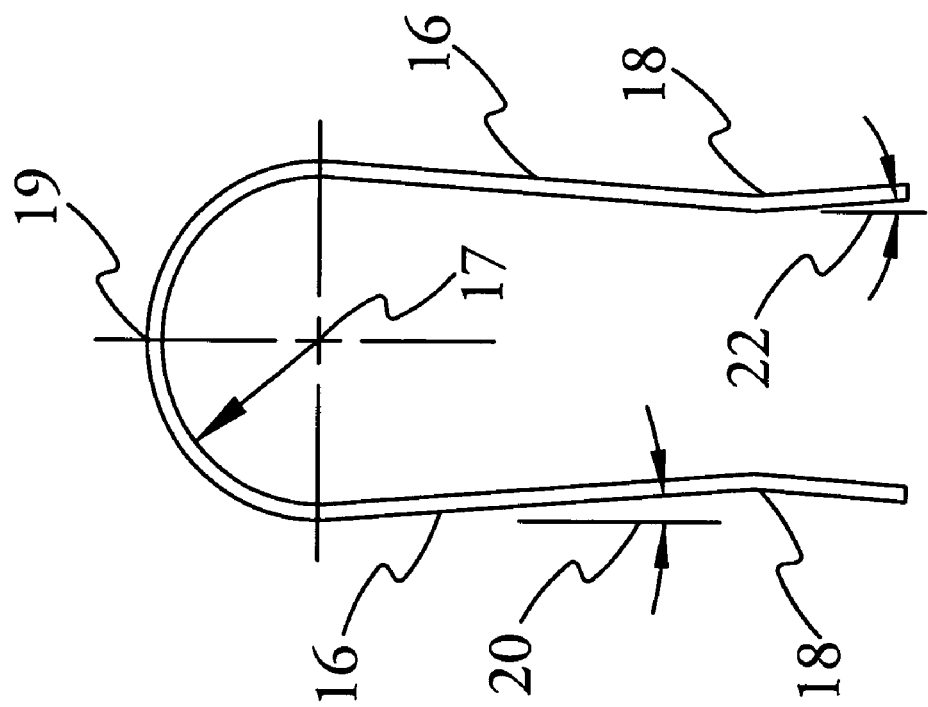
FIG. 9 is an end view of the clip showing another alternative embodiment of the legs of the clip.

As shown in FIG. 8, the clamping members (legs) of the clip extend parallel to one another so that the distance between them always remains the same. In FIG. 9, another embodiment shows each of clamping members 16 tapered at point 18 by forming clamping members inward by angle 20 and outward from point 18 by angle 22. Angle 20 preferably ranges from 3 to 5 degrees and angle 22 ranged from 4 to 6 degrees. In this manner, when clip 10 is placed around hanger rod 30 and stiffening member 32 prior to tightening as shown in FIG. 4, clip 10 will be held in place while it is securely fastened.

Referring now to FIGS. 4 and 5, it can be seen why the present invention provides much greater strength and stability than prior art devices such as disclosed and claimed by Roth. Hanger rod 30 is disposed between stiffening member 32 and locking mechanism 28. Critical dimension 26 is achieved by maintaining a distance 5.162 inches ±0.0005 inches between 0.261 inch diameter holes on the flat pattern, prior to forming the U-shaped clip, and increasing the distance between the holes by 0.364 inches for each 1/8 inch increase in hanger rod diameter. This is achieved by precise hole placement of hole sets 12, 14 with respect to the length of clamping members 16 which provides the proper pinching on hanger rod 30. In fact, the inventor has found that a deviation of ±0.001 in hole placement will result in a clip that fails the compression test. The deformation of the clip, precise location of the holes and the use of flat washers are required for the clip to develop sufficient clamping force to prevent slippage of the hanger rod relative to the stiffening pipe.

The compression test is conducted by placing an unstiffened hanger rod of a length equal to that prescribed by the American Institute of Steel Construction (AISC) Allowable Stress Design (ASD) buckling formula (Kl/r) between two steel plates. An ever increasing compression load is applied until buckling occurs to establish a base line resistance to buckling under compression force. Loss of pressure on the gauge of the test apparatus indicates that buckling has occurred. In the case of 3/8 inch hanger rod, the unstiffened length per the Kl/r formula is 24 inch. Then a 3/8 inch hanger rod 120 inch long with rod stiffening clips spaced at a distance that is equal to the maximum length of the unstiffened rod permitted by the Kl/r formula, which is 24 inch for 3/8 inch rods, is tested.

The 120 inch long hanger rod/stiffening assembly is placed in the test apparatus and subjected to the same test of ever increasing compression pressure until buckling failure is indicated by the sudden loss of pressure on the gauge of the test apparatus. The stiffening clips are successful, if buckling failure pressure on the gauge of the test apparatus is greater than or equal to the compression failure level for the 24 inch rod.

As noted above, this embodiment is useful for three different diameter of hanger rod 30. For use with a 3/8-inch hanger rod 30, hole set 12 is used wherein a fully threaded screw (diameter size and thread size 1/4-20×1 1/4) is inserted in the holes and held via standard flat washers 23, 24 and lock nuts 22, 25. While two nuts are preferable, a machine screw well known in the art could be used instead. In fact, any bolt type is suitable as long as the legs of the clip can be drawn tightly together as shown in FIGS. 4 and 5 and is sufficiently strong to withstand the design forces that may be encountered.

Figure 10:
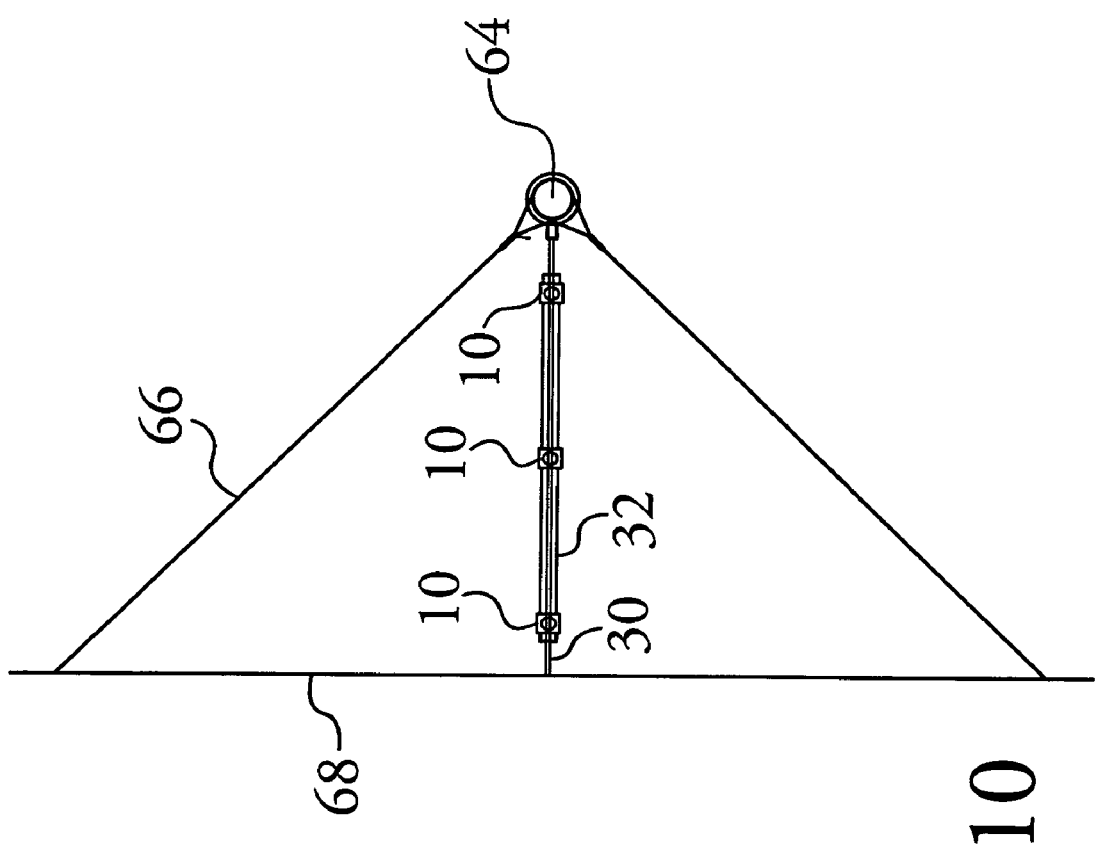
FIG. 10 is a detailed view of the rod 30 and stiffening member 32 using clips 10 in accordance with the invention.

FIG. 10 is a detailed view of hanger rod 30 and stiffening member 32 using clips 10 in accordance with the invention. FIG. 10 depicts the installation of a typical pipe/rod stiffening member 32 on hanger rod 30 using three stiffening clips 10. The use of hanger rod 30 is to hold a braced pipe 64 that is substantially parallel to the surface of the structure. Stiffening member 32 attempts to maintain the compression value of hanger rod 30 to resist buckling. The clips 10 stiffen further hanger rod 30 to increase the prevention of buckling under various load conditions so that the stiffening rod will not go into compression as quickly as it would without the use of this device. In order for clips 10 to work, they must be tightened to sufficiently deform clip 10 to the contours of the contacted surfaces of hanger rod 30 and hanger rod stiffening member 32 assembly. The hanger rod and stiffening pipe assembly are held together with sufficient force to prevent them from slipping parallel to each other.

The clip's manufacture requires critical locations of the holes to a ±0.005 tolerance. Additionally, washers (not shown) must be installed under the head and bolt in order to tighten the connection until both legs of clip 10 are flush. Without the use of a washer, there will not be sufficient room to use a socket wrench to tighten a connection until both legs of clips 10 are flush. The preferable location and spacing is as follows. The maximum dimension between structure 68 to the first clip 10 is preferably 3 inches. The preferable distance between the first clip and the second clip and the second and third, which is the bottom most clip, varies in accordance with maximum allowable horizontal loads as determined by loads well known in the art such as found in allowable stress design manuals. Left and right sway braces 66 complete this section.

In the 3/8 inch hanger rod test, the unstiffened hanger rod failed at 125 psi on the apparatus test gauge and the 120-inch rod stiffened with the invention failed at 325 psi.

The typical installation is for use with a 5/8 inch hanger rod 30, hole set 14 as described above. For use with a 1/2 inch hanger rod 30, one hole of hole set 12 and one hole of the opposing hole set 14 is used. Stiffening member 32 is preferably 1 inch nominal schedule 40 or schedule 10 pipes as both these sizes have the same outside diameter. In this manner, the critical dimension is achieved. To adjust clip 10 for use with other sizes of hanger rods and/or stiffening members, the dimensions would be scaled according to the specifications provided herein.

While certain representative embodiments of the invention have been described herein for the purposes of illustration, it will be apparent to those skilled in the art that modification therein may be made without departure from the spirit and scope of the invention.

What is claimed is:

1. A U-shaped hanger rod clip for holding two round members; a stiffening member having an outside diameter in direct contact with a vertical hanger rod having a diameter; wherein said clip protects the hanger rod against buckling forces, said clip comprising:

a malleable, flat clip member having a left leg clamping member and right leg clamping member wherein said members are substantially the same and wherein each of said clamping members has a set of critically positioned openings that correspond to an opening set of openings in the opposing clamping member wherein each opening set in said left and right clamping member has openings having sizes and locations with a tolerance of not greater than 0.005 inches to enable sufficient clamping force to prevent slippage of the hanger rod relative to the stiffening member; wherein said flat clip member also having a circular arc section such that when said clip member is attached around the stiffening member and the vertical hanging rod, said left and right leg clamping members are drawn tightly flush with each clamping member against one another using a bolt and washer positioned through one opening in said left leg clamping member and an opening in the right leg clamping member; and wherein said circular arc is thus firmly held against said stiffening member.

2. The hanger rod clip of claim 1 wherein each set of openings of each said clamping member are positioned such that different diameters of the hanger rod can be accommodated by said clip by selecting a pair of opposing openings in of the respective opening sets in the clamping members.

3. The hanger rod clip of claim 1 wherein said right and left clamping member legs providing a respective opening end wherein the distance between the opening end is substantially the same as the diameter of said circular arc section.

4. The hanger rod clip of claim 1 wherein hanger rod clip is made from a single piece of galvanized sheet metal.

5. A stiffening assembly comprising:

at least one clip as claimed in claim 1, a pair of sway braces, a hanger rod, a stiffening member, all attached to a bracing member to provide the stiffening assembly.

* * * * *